United States Patent
Thamma et al.

(10) Patent No.: US 11,995,295 B2
(45) Date of Patent: May 28, 2024

(54) CLEANING NOTIFICATIONS

(71) Applicant: Hewlett-Packard Development Company, L.P., Spring, TX (US)

(72) Inventors: Nick Thamma, Spring, TX (US); Nam Nguyen, Spring, TX (US); Conrad Walter Henry, Jr., Spring, TX (US); Alan Tam, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 50 days.

(21) Appl. No.: 17/888,445

(22) Filed: Aug. 15, 2022

(65) Prior Publication Data
US 2024/0054881 A1 Feb. 15, 2024

(51) Int. Cl.
| | | |
|---|---|---|
| *G06F 3/0484* | (2022.01) | |
| *G06F 3/041* | (2006.01) | |
| *G06F 3/0488* | (2022.01) | |
| *G08B 21/18* | (2006.01) | |
| *G08B 21/24* | (2006.01) | |
| *G01C 21/16* | (2006.01) | |
| *G01D 5/14* | (2006.01) | |
| *G06F 11/30* | (2006.01) | |

(52) U.S. Cl.
CPC .......... *G06F 3/0484* (2013.01); *G06F 3/0416* (2013.01); *G06F 3/0488* (2013.01); *G08B 21/182* (2013.01); *G08B 21/24* (2013.01); *G01C 21/16* (2013.01); *G01D 5/145* (2013.01); *G06F 11/3055* (2013.01)

(58) Field of Classification Search
CPC ........ G06F 3/00; G06F 3/0354; G06F 3/0482; G06F 3/0483; G06F 3/0484; G06F 3/0485; G06F 3/04842; G06F 3/04847; G06F 3/0488; G06F 3/04883
See application file for complete search history.

(56) References Cited

U.S. PATENT DOCUMENTS

| | | | |
|---|---|---|---|
| 7,626,579 B2 | 12/2009 | Hague et al. | |
| 8,816,974 B2 | 8/2014 | Larson et al. | |
| 10,585,510 B2* | 3/2020 | Kosugi | G06F 3/1454 |
| 2017/0255378 A1* | 9/2017 | Desai | G06F 3/04883 |
| 2020/0094785 A1 | 3/2020 | Herman et al. | |
| 2021/0197859 A1 | 7/2021 | Canady et al. | |

FOREIGN PATENT DOCUMENTS

| | | | |
|---|---|---|---|
| CN | 103229132 | * | 7/2013 |
| WO | 2019/067128 A1 | | 4/2019 |

OTHER PUBLICATIONS

NPL Search (Nov. 29, 2023).*

* cited by examiner

*Primary Examiner* — Van T Trieu
(74) *Attorney, Agent, or Firm* — Knobbe, Martens, Olson & Bear, LLP (57) ABSTRACT

In one example, a notification may be generated to prompt a user to clean a personal computing device. The notification may be based upon usage data of the personal computing device. Multiple types of usage data may be determined and combined to create a composite usage value. The composite usage value may be compared to a threshold usage value. A notification may be generated if the composite usage value exceeds the threshold usage value.

20 Claims, 5 Drawing Sheets

CLEANING NOTIFICATIONS

BACKGROUND

Personal computing devices have become ubiquitous such that many users regularly interact with such personal computing devices. The more users interact with the computing devices, the more contaminated the personal computing devices can become. Contaminants may include dust, dirt, and oil. Contamination may result in degraded performance of the personal computing device. Contaminants may also include bacteria and viruses, which may result in spreading communicable diseases.

BRIEF DESCRIPTION OF THE DRAWINGS

Examples of the disclosure are rendered by reference to specific examples thereof which are illustrated in the appended drawings. The drawings illustrate only particular examples of the disclosure and therefore are not to be considered to be limiting of its scope. The principles herein are described and explained with additional specificity and detail through the use of the accompanying drawings in which.

DETAILED DESCRIPTION

As noted above, a personal computing device can become contaminated with frequent use. Many users may clean their personal computing device on a periodic basis, for example, every week. Contamination of a personal computing device may increase over time and therefore the elapsed time since a personal computing device was cleaned may be relevant in recommending cleaning. The extent of contamination may also be affected by the way in which the personal computing device is used. Computing device manufacturers expect that computing devices be cleaned regularly. However, regular cleaning is dependent upon the user's ability to detect contamination. The user also has to remember to clean the device when the device becomes contaminated. Without regular cleaning, the personal computing device performance may suffer.

In accordance with examples of the present disclosure, an analysis of personal computing device usage data may be used to determine if the personal computing device should be cleaned. In some examples, elapsed time and usage data since a personal computing device was cleaned may be used in conjunction to determine if the personal computing device should be cleaned.

In some examples, a threshold value for each of multiple types of usage data may be defined. Each type of usage data may be measured to determine a corresponding usage value. In some examples, a usage value for each type of usage data may be recorded and may be stored in a corresponding usage data register. A threshold value may be defined for each type of usage data. Each usage value may be compared to a corresponding defined threshold value. Each defined threshold value indicates a usage for which cleaning the personal computing device is recommended. If the usage value exceeds the corresponding defined threshold value, a notification may be generated to remind a user to clean a personal computing device.

In this manner, users need not remember to clean their personal computing devices as a cleaning notification prompt is automatically generated and sent to a user. This automatic notification ensures that users receive the best image quality from their computing devices and corresponding peripherals such as displays and cameras, the notification can also facilitate enhanced performance and accuracy from the sensors. The automatic cleaning notification not only aids in personal computing hardware health, the notification promotes users' health by preventing the exposure, transmission and infection from viral and bacterial bodies.

In some examples, multiple types of usage data may be measured and combined to create a composite usage value. The composite usage value may be compared to a defined threshold usage value corresponding to the composite usage value. A notification may be generated if the composite usage value exceeds the corresponding threshold usage value.

In some examples, a measurement of usage data and comparison to a defined threshold may be effectuated periodically, and the period may be based upon previous measurements. For example, a measurement of usage data and comparison to a defined threshold may be effectuated weekly and if cleaning is consistently indicated the period may be shortened to daily.

In some examples of the present disclosure, usage data may include a number of touches on a touchscreen since a personal computing device was cleaned. In some examples, usage data may include a duration of touches, which may include the duration of individual touches and may include a cumulative duration. The number and duration of touches may indicate the extent of contaminants on the touchscreen. In some examples, the number and duration of touchscreen touches (touchscreen data) may be recorded and may be stored as a touchscreen usage value in a touchscreen register.

In some examples of the present disclosure, usage data may include movement data since a personal computing device was cleaned. Movement data may indicate how many times a personal computing device has been placed in a storage container or removed from a storage container and placed on a surface such as a desk or a user's lap. The movement data may indicate how frequently a personal computing device is used as well as the time duration that a personal computing device has been exposed to contaminants. In some examples, the movement data may be determined using a movement sensor. For example, an inertial measurement unit (IMU) may be used to determine an orientation, angular velocity, and acceleration of the personal computing device. The movement data may be used to determine how many times the personal computing device has been moved from a storage, such as a case, to a desk or a user's lap, for example. In some examples, human presence detection sensors or thermal on-lap sensors may be used to indicate movement of the personal computing device from storage to a use environment.

In some examples, the movement data may be recorded and may be stored as a movement value in a register.

In some examples of the present disclosure, usage data may include position data that may indicate how frequently a personal computing device has been in an open position. In some examples in which a personal computing device has a closable lid (e.g., a laptop computer), position data may include an elapsed time during which the lid has remained in an open position. The time a personal computing device lid has remained open may indicate a time that a personal computing device has been exposed to contaminants. In some examples, the position data may be determined by using a Hall Effect sensor of the personal computing device to determine how many times the lid of the personal computing device has been opened and how long the lid has remained in an open position. In some examples, the position data may be recorded and may be stored as a position value in a register.

In some examples, usage data may include sensor interference data. Sensor interference data is data that indicates contaminants on a personal computing device interfering with sensor operation. The sensor interference data may be determined by comparison of a measured sensor performance to an expected performance or a factory calibrated performance. For example, a measured time-of-flight (ToF) sensor crosstalk value may be compared to a factory calibrated crosstalk value. The difference between a measured crosstalk value and a calibrated crosstalk value, such as an increase in the measured crosstalk value relative to the calibrated crosstalk value, is an example of sensor interference data. The sensor interference data may be recorded and may be stored as an interference value in a register.

Accordingly, examples of the present disclosure analyze usage data to determine if a personal computing device should be cleaned. In some examples, an elapsed time since a personal computing device was last cleaned is a type of usage data and the usage data analysis includes an elapsed time since the personal computing device was last cleaned.

Example instructions to implement a cleaning notification process for a personal computing device according to examples of the present disclosure may be stored on a non-transitory computer-readable storage medium where the term "non-transitory" does not encompass transitory propagating signals. A non-transitory computer-readable storage medium may be any electronic, magnetic, optical, or other physical storage device that stores executable instructions. For example, a non-transitory computer-readable storage medium may be a random-access memory (RAM), an electrically erasable programmable read-only memory (EEPROM), a storage drive, an optical disc, or the like. A non-transitory computer-readable storage medium 100 may be encoded to store executable instructions that cause a processor to perform operations according to examples of the disclosure.

Figure 1A:
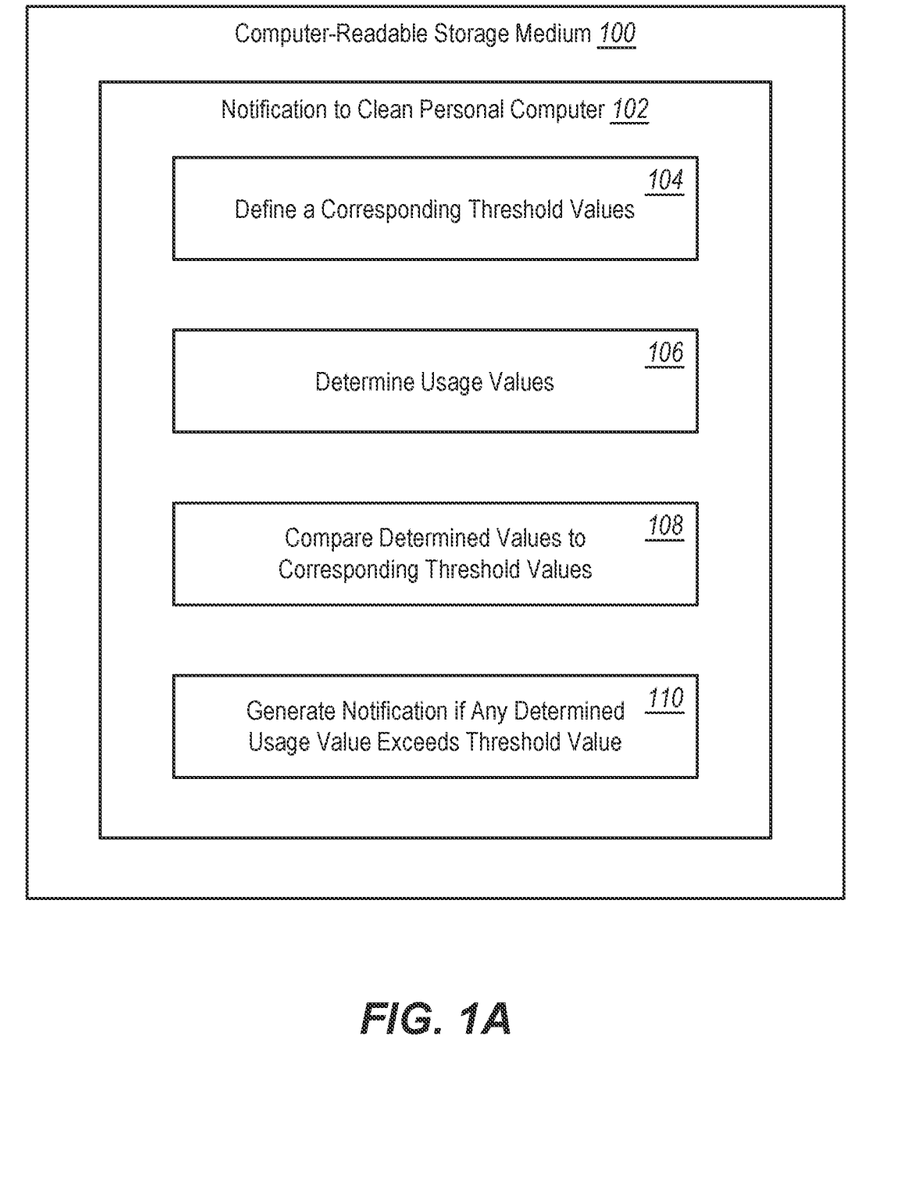
FIG. 1A illustrates example instructions stored on a non-transitory computer-readable storage medium to implement a cleaning notification process for a personal computing device according to an example of the present disclosure.
Figure 1B:
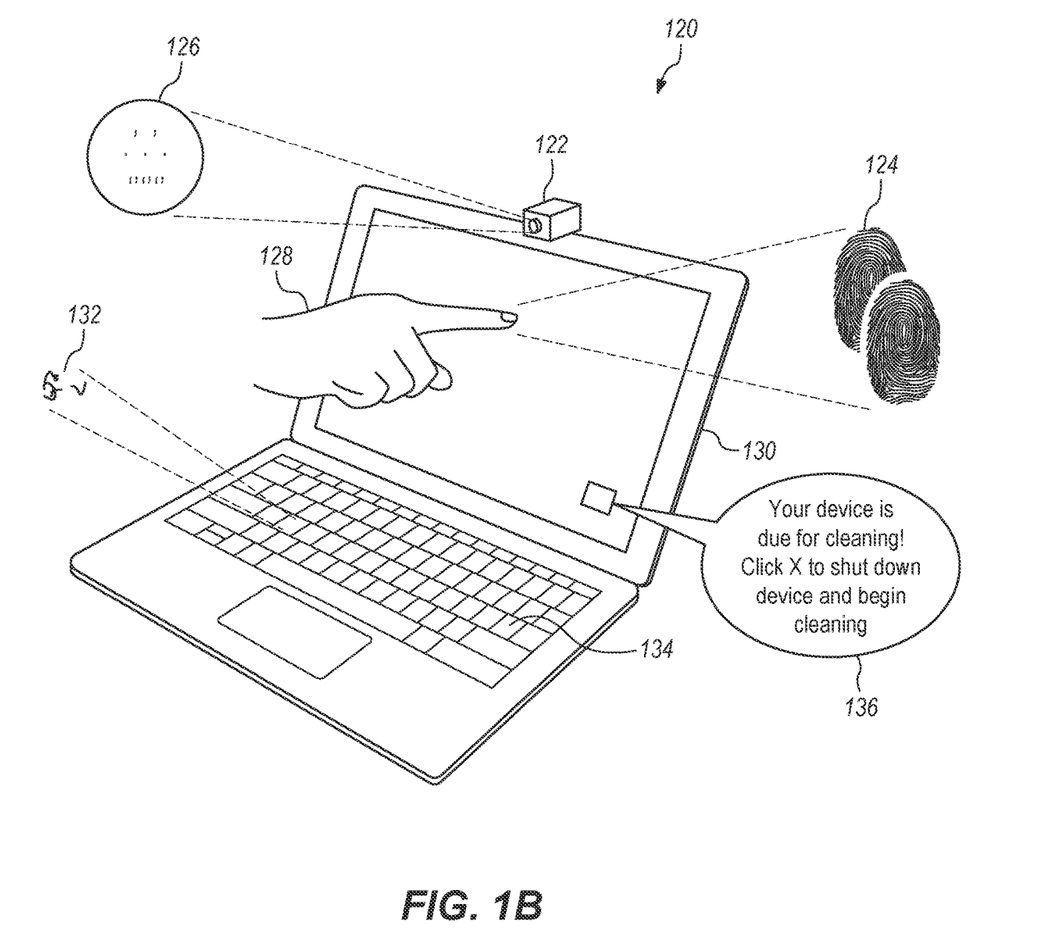
FIG. 1B illustrates an example personal computing device that may be cleaning according to examples of the present disclosure.

FIG. 1A illustrates example instructions stored on a non-transitory computer-readable storage medium 100 to implement a cleaning notification process for a personal computing device according to an example of the present disclosure. FIG. 1B illustrates an example personal computing device 120 that may be cleaned according to examples of the present disclosure.

Referring to FIG. 1A and FIG. 1B, the non-transitory computer-readable storage medium 100 includes instruction 102 that may cause a processor to provide notification to a user 128 that personal computing device 120 should be cleaned. Instruction 102 may include instruction 104, instruction 106, instruction 108, and instruction 110.

Instruction 104 may cause a processor to perform the operation of defining a threshold value for each of multiple types of usage data. As discussed above, the defined threshold values may reference touchscreen use for example. Such touchscreen use by a user 128 (FIG. 1B) may result in repeated fingerprint smudges 124 that impact image and text visibility on a monitor 130. Frequent use of personal computing device 120 can also result in the buildup of dust 126 on camera lens 122 and may cause dirt 132 on the personal computing device keypad 134, which may cause generation and display of a cleaning notification such as cleaning notification 136. Threshold values may indicate a level of dust, dirt, and oil on the personal computing device. The defined threshold values may also reference movement, position, sensor interference, and an elapsed time since personal computing device 120 was last cleaned.

Instruction 106 may cause a processor to perform the operation of determining a usage value for each usage data type. The usage values for each usage data type may be determined by reference to software, registers, sensor activation data and sensor interference data, among others. For example: The elapsed time since the personal computing device 120 was cleaned may be determined by reference to activation of functions of a personal computing device cleaning reminder program. A touchscreen usage value may be determined by reference to a touchscreen register. A movement value may be determined by reference to activation data of an IMU or other human presence detection sensors. A position value may be determined by reference to activation data of a Hall Effect sensor. A sensor interference value may be determined by reference to a crosstalk measurement (e.g., ToF sensor crosstalk).

Instruction 108 may cause the processor to perform the operation of comparing a determined usage value to a corresponding threshold value. A determined usage value for each usage data type may be compared to a corresponding defined threshold.

Instruction 110 may cause the processor to perform the operation of generating a notification if the determined usage value for any usage data type exceeds the corresponding defined threshold. A notification may remind a user to clean a personal computing device. Cleaning may be effectuated through use of personal computing device 120 cleaning program that locks I/O functions during cleaning for example. When cleaning is completed each usage data register may be reset. In another example, cleaning may also be effectuated after the personal computing device 120 is shut down.

Figure 2:
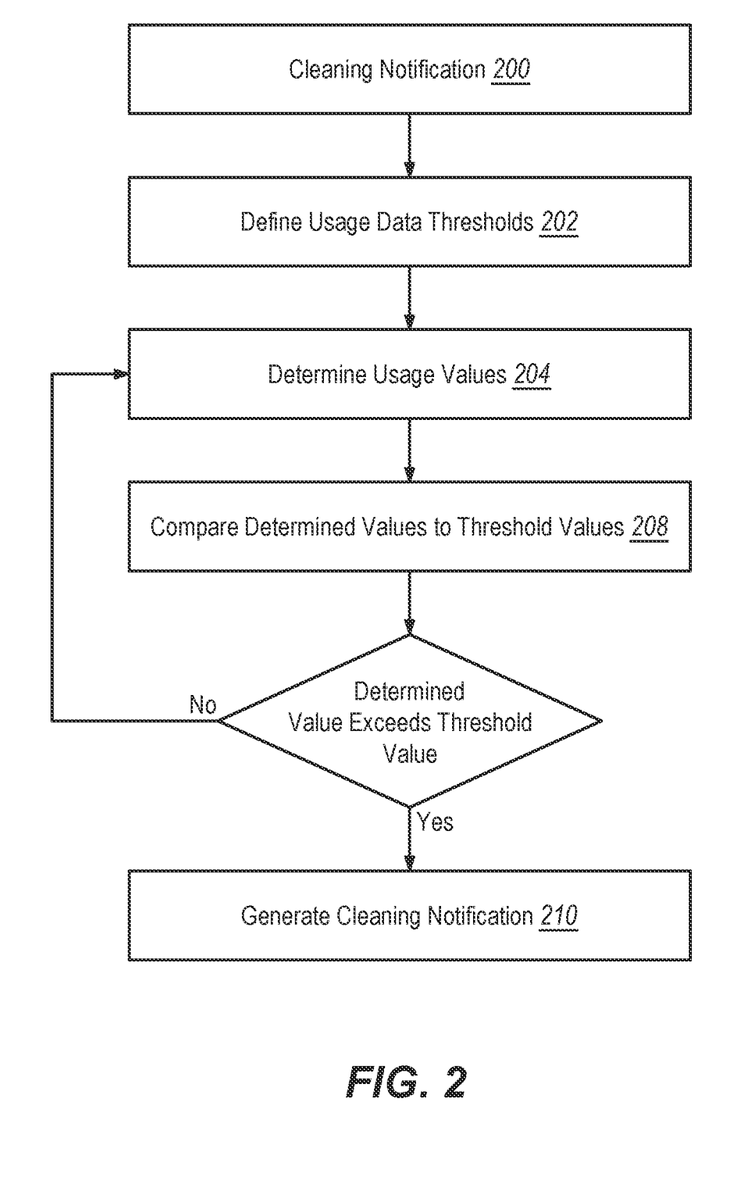
FIG. 2 illustrates an example process to provide a cleaning notification for a personal computing device according to some examples of the present disclosure.

FIG. 2 illustrates an example process to provide a cleaning notification for a personal computing device according to some examples of the present disclosure. Cleaning notification process 200, begins with operation 202 at which a threshold is defined for each of several usage data types as discussed above. In some examples, usage data types may include touch screen data, movement data, position data, and interference data. The defined threshold for each usage data type represents a level of usage that indicates cleaning is recommended.

At operation 204 a usage value for each usage data type is determined. In some examples touchscreen data may indicate a number and duration of touchscreen touches and may be determined by reference to a touchscreen registry. In some examples, movement data may indicate how often a personal computing device has been moved from storage to an operating location and may be determined by using a movement sensor, such as an IMU. In some examples, position data may indicate how long a lid of a personal computing device has remained open and may be determined by using a Hall Effect sensor. In some examples interference date may indicate interference with one or more sensors and may be determined by comparison of a measured crosstalk value to a calibrated crosstalk value. A determined usage value for each usage data type may be stored in a usage value register (e.g., registers 432, 434, 436, and 438 of FIG. 4).

At operation 206, the determined usage value is compared to the defined threshold value for each usage data type. In some examples, a personal computing device may include personal computing device cleaning software (e.g., cleaning module 456 of FIG. 4). The cleaning software may include a comparison module (e.g., comparison module 458 of FIG. 4) to compare determined usage values with defined threshold values for each usage data type.

If, at operation 206, any usage value exceeds a corresponding threshold value for any usage data type, then at operation 208, a cleaning notification may be generated by a notification module (e.g., notification module 459 of FIG. 4) to prompt a user to clean the personal computing device. If, at operation 206, no usage value exceeds a corresponding defined threshold for any usage data type then, the process returns to operation 204 to determine updated usage values for each usage data type. Usage values for each usage data type may be determined periodically (e.g., once per day) and compared to the corresponding defined threshold values.

As discussed above in reference to FIG. 1A and FIG. 1B, each usage data type has a corresponding threshold value. If a determined value of any usage data type exceeds a corresponding threshold value, a notification may be generated. A personal computing device may require cleaning prior to a determined value of any usage data type exceeding a corresponding threshold value. For example, a determined value of several usage data types may indicate that cleaning is warranted even though none of the determined values exceeds a corresponding threshold value. Accordingly, examples of the present disclosure may combine determined usage values of several usage data types to create a composite usage value. A threshold value corresponding to the composite usage value may be defined. The composite usage value may be compared to the corresponding threshold value. In some examples, a touchscreen usage value and a movement value may be combined to create a composite computing device usage value. The composite computing device usage value may be compared to a corresponding defined threshold value. In some examples, additional computing device usage data may be combined with the touchscreen usage value and the movement value to create a composite computing device usage value. For example, the additional computing device usage data may be an elapsed time since the personal computing device was last cleaned. In another example, the additional computer usage data may be position data indicating an elapsed time the personal computing device has remained in an open position.

Figure 3:
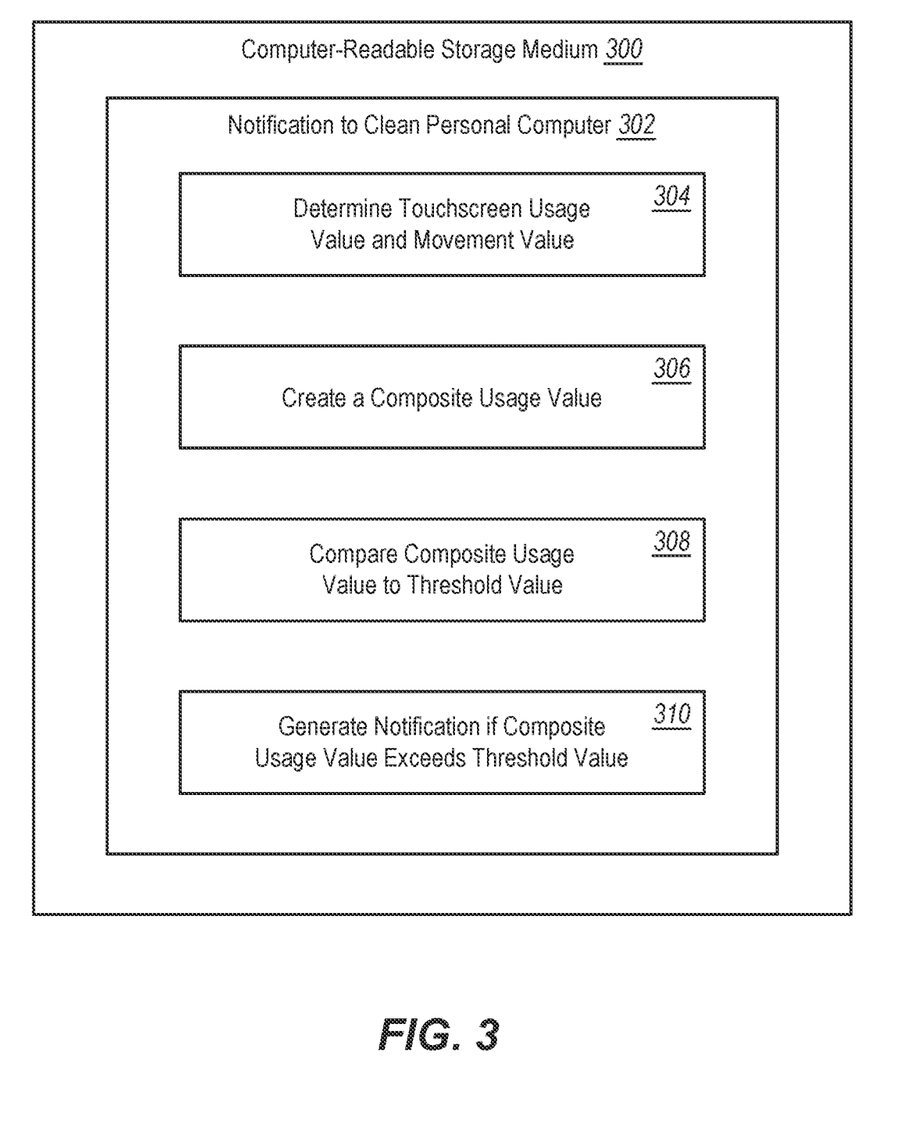
FIG. 3 illustrates example instructions stored on a non-transitory computer-readable storage medium to implement a cleaning notification process for a personal computing device according to an example of the present disclosure.

FIG. 3 illustrates example instructions stored on a non-transitory computer-readable storage medium to implement a cleaning notification process for personal computing device 120 of FIG. 1B according to the present disclosure.

As shown in FIG. 3, the non-transitory computer-readable storage medium 300 includes instruction 302 that may cause a processor to provide notification to user 128 (FIG. 1) that personal computing device 120 should be cleaned. Instruction 302 may include instruction 304, instruction 306, instruction 308, and instruction 310.

Instruction 304 may cause a processor to perform the operation of determining a touchscreen usage value and a movement value. The touchscreen usage value and the movement value may be stored in corresponding registers.

Instruction 306 may cause a processor to perform the operation of combining the touchscreen usage value and the movement value to create a composite usage value. The composite usage value may represent the combined effects of the touchscreen touches and movement of the personal computing device 120.

Instruction 308 may cause the processor to perform the operation of comparing a composite usage value to a corresponding threshold value. A determined composite usage value may be compared to a corresponding defined threshold. Instruction 310 may cause the processor to perform the operation of generating a notification if the determined composite usage value exceeds the corresponding defined threshold.

Note that FIG. 3 illustrates combining touchscreen usage data and movement data to create a composite usage value. For other examples of the present disclosure, any of the usage data types may be combined to create a composite usage value.

Figure 4:
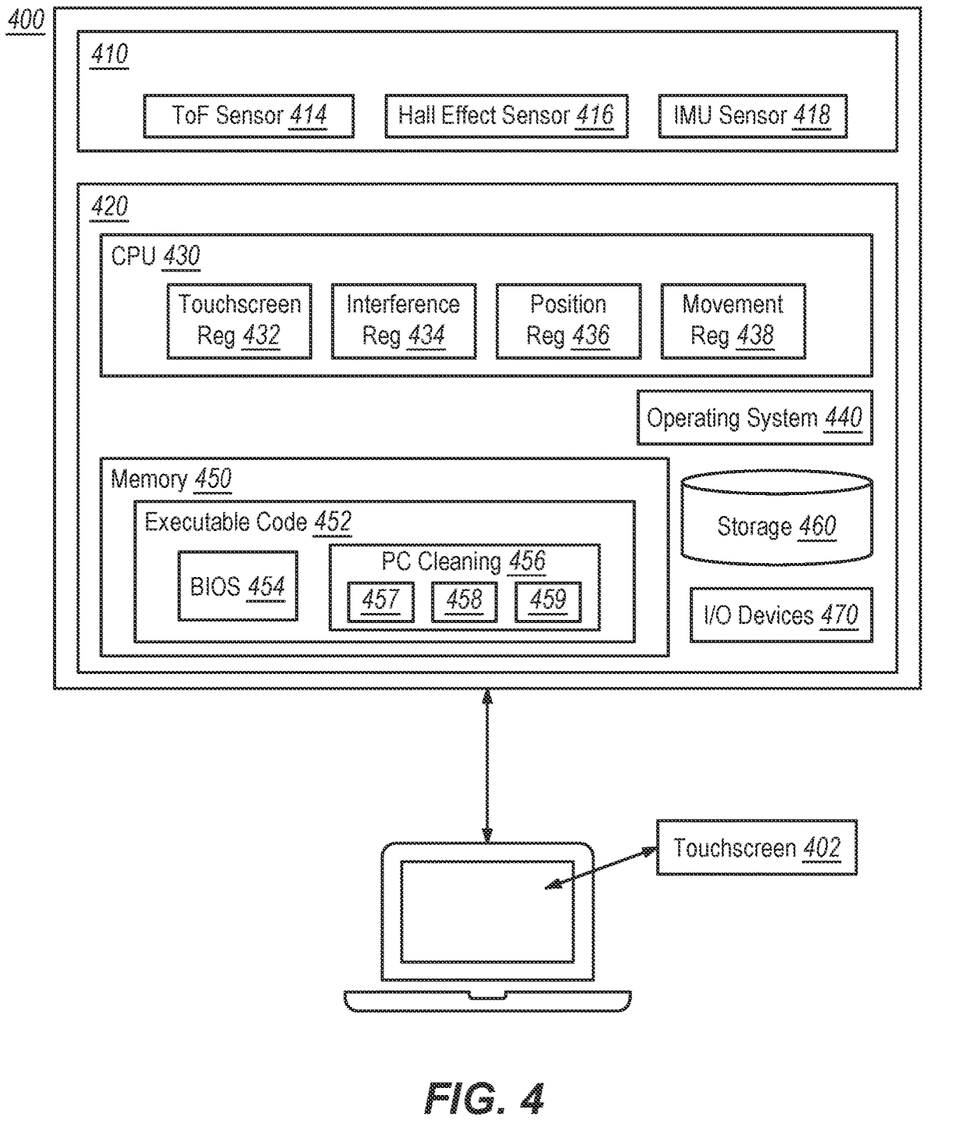
FIG. 4 illustrates an example personal computing device according to an example of the present disclosure.

FIG. 4 illustrates an example personal computing device 400 to provide a cleaning notification according to an example of the present disclosure. According to examples of the disclosure, the personal computing device 400 may include or may be, for example, a personal computer, a desktop computer, a mobile computer, a laptop computer, a notebook computer, a terminal, a workstation, or other personal computing device. The personal computing device 400 of FIG. 4, shown for example, as a laptop computing device, including a touchscreen 402.

As shown in FIG. 4, the personal computing device 400 may include sensors 410. Sensors 410 may include a variety of sensors, shown for example, as time-of-flight sensor 414, Hall Effect sensor 416, and IMU 418. A personal computing device in accordance with some examples of the present disclosure may also include other sensors such as thermal sensors and other types of human presence detection sensors.

The personal computing device 400 may include computing component 420. Computing component 420 may include a CPU 430 that may be, for example, a CPU, a chip or any suitable computing or computational device. The CPU 430 may include usage data registers for storing usage data. The touchscreen register 432 may store touchscreen usage data indicating the level of number and duration of touches to touchscreen 402. An interference register 434 may store sensor interference data. A position register 436 may store a position data. A movement register 438 may store movement data. As discussed above, the usage data may be used to determine whether or not to generate a notification to prompt a user to clean the personal computing device according to examples of the present disclosure.

The computing component 420 may include an operating system 440, a memory 450, a storage system 460 and input/output devices 470.

CPU 430 may be configured to carry out methods described herein and/or to execute various modules. The personal computing device 400 may include more than one computing component 420, and one or more computing components 420 may act as the components of a personal computing device according to examples of the present disclosure.

Operating system 440 may be, or may include, any code designed and/or configured to perform tasks involving controlling or otherwise managing operation of computing component 420. This may include scheduling execution of software programs or enabling software programs or other modules or units to communicate. As an example, operating system 440 may be a commercial operating system. In some examples of the disclosure, the computing component 420 may include a computing device that does not use an operating system (e.g., a microcontroller, ASIC, FPGA, or SOC).

Memory 450 may be implemented in various forms including random access memory (RAM), read-only memory (ROM), volatile or non-volatile memory, a cache memory, or other suitable memory units or storage units. Memory 450 may be a computer-readable non-transitory storage medium.

Executable code 452 may be any executable code, e.g., an application, a program, or a process. Executable code 452 may be executed by CPU 430 possibly under control of operating system 440. Examples of the present disclosure may include a plurality of executable code that may be loaded into memory 450 and cause CPU 430 to carry out methods described herein. Executable code 452 may include a basic input/output system (BIOS) 454. As used herein, a BIOS refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

Storage system 460 may be or may include, for example, a hard disk drive, flash memory, a micro controller-embedded memory, or removable storage. Content may be stored in storage system 460 and may be loaded from storage system 460 into memory 450 where it may be processed by CPU 430. Although shown as a separate component, storage system 460 may be embedded or included in memory 450.

Input/output devices 470 may include any suitable input devices such as a keyboard/keypad, mouse, and any suitable output devices such as displays or monitors. A universal serial bus (USB) device or external hard drive may be included in input/output devices 470. Any applicable input/output devices may be connected to computing component 420 by, for example, a wired or wireless network interface.

As discussed above, examples of the present disclosure may include a computer-readable medium, which when executed by a processor may cause the processor to perform operations disclosed herein. According to examples of the present disclosure, executable code 452 includes executable code implementing a personal computing device cleaning module 456, which may include a usage data recording module 457, a comparison module 458, and a notification module 459.

According to examples of the present disclosure, cleaning module may perform the functions of a personal computing device cleaning program that may periodically generate a notification to remind a user to clean the personal computing device. The cleaning module 456 may lock I/O functions during cleaning.

In some examples, a usage data recording module 457 may record usage data as described above. For example, usage data recording module 457 may record multiple types of usage data such as touchscreen usage data, movement data, position data and sensor interference data as described above. The usage data of each type may be recorded and stored as a usage value in a corresponding register. In some examples, usage data of multiple types may be combined to create a composite usage value.

In some examples, a comparison module 458, may compare each stored usage value to a corresponding defined threshold value. In some examples in which usage data of multiple types are combined to create a composite usage value, the comparison module 458, may compare a composite usage value to a corresponding defined threshold value.

In some examples, if a comparison module 458 determines that a usage value has exceeded a corresponding threshold value, a notification may be generated. In some examples where a usage value exceeds a corresponding threshold value, a notification module 459 may generate a notification to prompt a user to initiate functions of a personal computing device cleaning program. In some examples, the notification module 459 may periodically generate a notification until a cleaning is initiated. In some examples, notification module 459 may generate a notification to inform a user that functions of a personal computing device cleaning program will be initiated.

The various components of personal computing device 400 as shown in FIG. 4 are illustrative and are not intended to limit the scope of the present disclosure. In some examples, the personal computing device may include multiple interacting computing systems or devices, and the computing systems may be connected to other devices including through one or more networks such as the Internet, via the Web, or via private networks. More generally, a computing system may comprise any combination of hardware that may interact with and perform the described types of functionality when programmed or otherwise configured with particular software instructions and/or data structures including without limitation desktop or other computers, database servers, network storage devices and other network devices. In addition, the functionality provided by the personal computing device cleaning module as shown may, in some examples, be distributed in various modules. Similarly, in some examples, some of the functionality of the personal computing device cleaning module may not be provided while other additional functionality may be provided.

Furthermore, in some examples, some or all of the systems and modules may be implemented or provided in other manners such as by those consisting of one or more means that are implemented at least partially in firmware or hardware or combinations thereof, rather than as a means implemented in whole or in part by software instructions that configure a particular processor. The systems, modules, and data structures may also in some examples be transmitted via generated data signals on a variety of computer-readable transmission mediums, including wireless-based mediums and may take a variety of forms. Accordingly, examples of the present disclosure may be practiced with other computer system configurations.

While the above description is a complete description of specific examples of the disclosure, additional examples are also possible. Thus, the above description should not be taken as limiting the scope of the disclosure which is defined by the appended claims along with their full scope of equivalents.

The invention claimed is:

1. A non-transitory, computer-readable storage medium having stored thereon instructions which when executed by a processor, cause the processor to perform operations comprising:
   determining a touchscreen usage value and a movement value of a personal computing device;
   combining the touchscreen usage value and the movement value to create a composite usage value;
   comparing the composite usage value to a threshold value, the threshold value indicating the personal computing device is to be cleaned; and
   generating a notification when the composite usage value exceeds the threshold value.

2. The non-transitory, computer-readable storage medium of claim 1, wherein additional computing device usage data is combined with the touchscreen usage value and the movement value to create the composite computing device usage value.

3. The non-transitory, computer-readable storage medium of claim 2, wherein the additional computing device usage data comprises an elapsed time since the personal computing device was last cleaned.

4. The non-transitory, computer-readable storage medium of claim 2, wherein the additional computer usage data comprises a position data indicating an elapsed time the personal computing device has remained in an open position.

5. The non-transitory, computer-readable storage medium of claim 4, wherein the threshold value is to indicate a level of dust, dirt, and oil on the personal computing device.

6. The non-transitory, computer-readable storage medium of claim 2, wherein the additional computing device usage data comprises sensor interference data.

7. The non-transitory, computer-readable storage medium of claim 6, wherein the sensor interference data is determined by comparison of a measured crosstalk value of a time-of-flight sensor with a calibrated value of the time-of-flight sensor.

8. The non-transitory, computer-readable storage medium of claim 1 having stored thereon further instructions which when executed by the processor, cause the processor to perform further operations comprising:
   determining that the personal computing device has not been cleaned since the notification was last generated and periodically generating a reminder notification until the personal computing device has been cleaned.

9. A personal computing device comprising:
   a touchscreen register to record touchscreen touch data of the personal computing device;
   a movement sensor to record movement data of the personal computing device; and
   a cleaning module to create a composite computing device usage value from the touchscreen touch data and the movement data and provide a notification that the personal computing device should be cleaned if the composite computing device usage value exceeds a threshold.

10. The personal computing device of claim 9, wherein the movement sensor is an inertial measurement unit.

11. The personal computing device of claim 9, further comprising:
   a time-of-flight sensor, wherein comparison of a measured crosstalk value of the time-of-flight sensor with a calibrated crosstalk value of the time-of-flight sensor indicates an interference value and the cleaning module uses the interference value to create the composite computing device usage value.

12. The personal computing device of claim 9, further comprising:
   a Hall Effect sensor wherein Hall Effect sensor activation data from the Hall Effect sensor indicates an elapsed time that a lid of the personal computing device has remained in an open position and the cleaning module uses the Hall Effect sensor activation data to create the composite computing device usage value.

13. A computing device comprising:
   a computing device usage data recording module to record usage data collected by a sensor of the computing device, wherein the usage data relates to how a user uses the computing device, and wherein the usage data includes a first type of data, a second type of data, a third type of data, and a fourth type of data;
   a comparison module to determine if a value of any of the first type of data, the second type of data, the third type of data, and the fourth type of data exceeds a threshold; and
   a notification module to generate a notification when the value exceeds the threshold.

14. The computing device of claim 13, wherein the first type of data comprises touchscreen usage data.

15. The computing device of claim 13, wherein the second type of data comprises sensor interference data.

16. The computing device of claim 13, wherein the third type of data comprises movement data.

17. The computing device of claim 16, wherein the movement data is determined by reference to the sensor.

18. The computing device of claim 17, wherein the sensor comprises an inertial measurement unit.

19. The computing device of claim 13, wherein the fourth type of data comprises position data.

20. The computing device of claim 19, wherein the sensor comprises a Hall Effect sensor.

* * * * *